United States Patent
Hainich

(10) Patent No.: US 11,867,903 B2
(45) Date of Patent: Jan. 9, 2024

(54) DEVICE AND METHOD FOR THE NEAR-EYE DISPLAY OF COMPUTER GENERATED IMAGES

(71) Applicant: Rolf R. Hainich, Berlin (DE)

(72) Inventor: Rolf R. Hainich, Berlin (DE)

(*) Notice: Subject to any disclaimer, the term of this patent is extended or adjusted under 35 U.S.C. 154(b) by 0 days.

(21) Appl. No.: 14/852,573

(22) Filed: Sep. 13, 2015

(65) Prior Publication Data
US 2016/0077336 A1 Mar. 17, 2016

(30) Foreign Application Priority Data
Sep. 15, 2014 (DE) .......................... 102014013320.6

(51) Int. Cl.
*G02B 27/01* (2006.01)
*G02B 5/20* (2006.01)
(Continued)

(52) U.S. Cl.
CPC .......... *G02B 27/017* (2013.01); *G02B 5/201* (2013.01); *G01J 1/0429* (2013.01); *G02B 5/3083* (2013.01);
(Continued)

(58) Field of Classification Search
CPC .... G09G 3/3208; G09G 5/377; G02B 27/017; G02B 5/201; G02B 5/3083; G02B 2027/0178; G01J 1/0429; G06T 2219/008
See application file for complete search history.

(56) References Cited

U.S. PATENT DOCUMENTS 5,162,828 A * 11/1992 Furness .................. G01S 13/60
                                                                           351/158
6,215,593 B1    4/2001 Bruce
(Continued)

FOREIGN PATENT DOCUMENTS

EP       0580261 A1    1/1994
EP      93202169.4 A    1/1994

OTHER PUBLICATIONS

Method of achieving a wide field-of-view head-mounted display with small distortion Jianming Yang, Weiqi Liu, Weizhen Lv, Daliang Zhang, Fei He, Zhonglun Wei and Yusi Kang Optics Letters Jun. 15, 2013 / vol. 38, No. 12 / 2035.
(Continued)

*Primary Examiner* — Insa Sadio
*Assistant Examiner* — Saifeldin E Elnafia

(57) ABSTRACT

A near-eye display device for virtual or augmented reality (AR), comprising of only a few, light-weight optical elements and offering high resolution and a large field of view. The device comprises a display positioned close to a user's eye and a concave, preferably partially transparent mirror, reflecting and focusing displayed images toward the user's eye. The display emits image forming light patterns from its side away from the eye and is clear transparent from its other side, allowing for a direct view through the display. This allows for a coaxial rather than the usual off-axis-configuration of the optical image forming elements, in particular the concave mirror and also the display itself, which may also serve as a second optical element if its surface has a non planar shape. These principles presented allow to overcome resolution limitations usually connected with simple optical configurations.

8 Claims, 3 Drawing Sheets

(51) Int. Cl.
*G01J 1/04* (2006.01)
*G02B 5/30* (2006.01)

(52) U.S. Cl.
CPC ............ *G02B 2027/0178* (2013.01); *G06T 2219/008* (2013.01)

(56) References Cited

U.S. PATENT DOCUMENTS

| | | | |
|---|---|---|---|
| 6,407,724 B2* | 6/2002 | Waldern | G02B 5/1885 345/7 |
| 2004/0108971 A1* | 6/2004 | Waldern | G02B 27/0093 345/8 |
| 2005/0088593 A1 | 4/2005 | Yamauchi | |
| 2005/0264502 A1* | 12/2005 | Sprague | G02B 5/10 345/84 |
| 2006/0092355 A1 | 5/2006 | Yang et al. | |
| 2010/0079356 A1* | 4/2010 | Hoellwarth | G02B 27/017 345/8 |
| 2010/0149073 A1* | 6/2010 | Chaum | G02B 27/0172 345/8 |
| 2012/0105740 A1* | 5/2012 | Jannard | G02C 9/04 348/794 |
| 2012/0281280 A1* | 11/2012 | Buehler | G02F 1/13363 977/932 |
| 2013/0286053 A1 | 10/2013 | Fleck et al. | |

OTHER PUBLICATIONS

Optical free-form surfaces in off-axis head-worn display design. O. Cakmakci, S. Vo, S. Vogl, R. Spindelbalker, A. Ferscha, and J. P. Rolland. In: Proceedings of The 7th IEEE and ACM International Symposium on Mixed and Augmented reality, ISMAR, pp. 29-32, New York, 2008. Springer. 738.

Jiamning Yang, Weiqi Liu, Weizhen Lv, Daliang Zhang, Fei He, Zhonglun Wei and Yusi Kang: Method of achieving a wide field-of-view head-mounted display with small distortion; Optics Letters Jun. 15, 2013/vol. 38, No. Dec. 2035 (citation [1] from initial application, as general state of the art example).

O. Cakmakci, S. Vo, S. Vogl, R. Spindelbalker, A. Ferscha, and J. P. Rolland: Optical free-form surfaces in off-axis head worn display design. Proceedings of 7th IEEE and ACM International Symposium on Mixed andAugmented reality, ISMAR, pp. 29-32 New York, 2008. Springer. (citation [2] from initial application, as general state of the art example).

* cited by examiner

Legend (all figures)
1. Eye
2. Pupil
3. Display
4. Mirror
5. Beam path
6. Display pixels
7. Transparent gaps
8. Foci
9. Light source
10. Passive reflective array
11. Image projector

DEVICE AND METHOD FOR THE NEAR-EYE DISPLAY OF COMPUTER GENERATED IMAGES

FIELD OF THE INVENTION

The invention is suitable as a display device in the field of Augmented Reality, but is not limited to this.

BACKGROUND OF THE INVENTION

Near-eye displays for Augmented Reality applications are usually implemented by means of a partially transmissive mirror supplying the image of a display attached beneath or above the eye. Extensive optical assemblies are required to accomplish a large field of view with high resolution, causing the devices to become unfavorably large and heavy. Current approaches using only one concave mirror are resulting in a resolution significantly below that of the eye, even if highly optimized mirror shapes are used. This is greatly owed to the off-axis optical configuration.

For applications of virtual or augmented reality, various display configurations are known, usually in the form of display glasses or a suitably equipped helmet. Helmet constructions have the advantage of allowing relatively large optical assemblies. They are common in military applications as pilot helmets and also allow for additional functions such as aiming by eye-pointing. The optical quality of these devices is high, but at the expense of size and weight, because elaborate configurations of many lenses are used for the preparation of the display images. A recent example of this design principle is described in [2].

These constructions are unsuitable for civil and especially for everyday applications such as those envisioned in the field of augmented reality for a long time. Here the objective are constructions similar to eyeglasses, with simple and compact and light-weight optical design.

Current embodiments of such display glasses are not optimal in various aspects. Prevailing issues are limited optical resolution, limited field of view, and small exit pupils demanding a very precise alignment of the optical assembly to the eye, which in turn requires additional mounting brackets and belts and does not allow for comfortable solutions suitable for everyday use.

An exemplary prior art approach toward a light-weight display (FIG. 1), consisting only of a display (3) located above or beneath the eye (1) and a concave mirror (4) focusing the display image to the eye, has been studied in [1]. Mirrors and display are arranged at an angle to each other (off-axis configuration). This leads to severe astigmatism (difference between horizontal and vertical focus) which can be reduced by giving the concave mirror an ellipsoidal shape. It has however been shown that this configuration only allows for an image resolution significantly below that of the human eye (cf. [1], page 30), even for a relatively small field of view, of about 20°.

In [3], an array of light emitting diodes constituting a back side transparent display is proposed for an approach different from the one proposed here. It comprises an array of lenses or micro mirrors, to generate a light-field display. The approach requires a very large number of display pixels (as stated at least 177 million). The cited patent concerns various ways of light field generation and providing the large pixel count.

BRIEF SUMMARY OF THE INVENTION

The present invention is intended to overcome the limitations of simple and light-weight optical solutions for augmented reality displays. A major problem with typical current solutions is the off-axis optical configuration, resulting from the need to move the display out of direct sight. Off-axis configurations suffer from resolution limitations due to astigmatism and other effects, especially with simple configurations consisting of only a few optical elements.

The invention presented here overcomes this by proposing the use of displays which are clear transparent from the back side (also dubbed "transmissive displays"), allowing for a coaxial configuration of the optical image forming elements, in particular a concave mirror and the display itself. The central aspect of the invention is an improvement of the optical performance by regarding the display itself as another optical element. This can be implemented by giving the display surface a convex shape.

The present invention allows to achieve a high resolution even with only one optical element.

A particularly advantageous embodiment of the invention is a configuration (FIG. 3) with a spherical mirror (4) and an inscribed spherical display (3), with the center points of both matching with the center of the eye (1). The display (3) shows the image on its side away from the eye (6), and the image is viewed seeing through the display from its transparent rear side, by means of the mirror.

The optical resolution of this embodiment is equal or better than the resolution of the human eye, and the field of view achievable is close to the full human field of view.

DETAILED DESCRIPTION OF THE INVENTION

The invention presented results from studies on performance issues of single mirror optics for augmented reality displays. We should note that the designs and the optical analysis presented concentrate on achieving maximum resolution and field of view. Geometric image distortions are not addressed, as these can easily be compensated for electronically.

One aspect of the invention, resulting from said studies, concerns improvements by using non-planar, i.e., curved displays. With organic OLED displays, such solutions will very likely be possible to realize in the near future. At least the bending of such displays in one direction has already been demonstrated.

Figure 1:
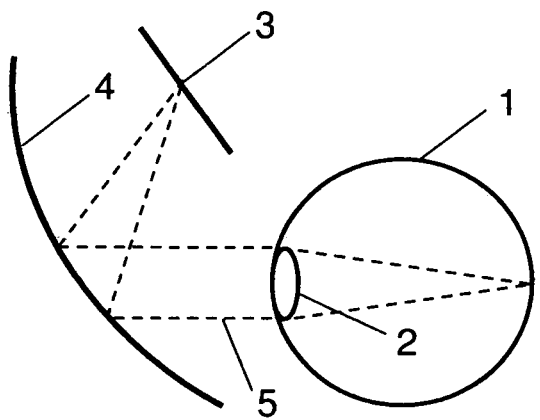
FIG. 1 (prior art) shows a classical augmented reality display assembly with a planar emissive display and a concave, semi-transparent mirror.
Figure 2:
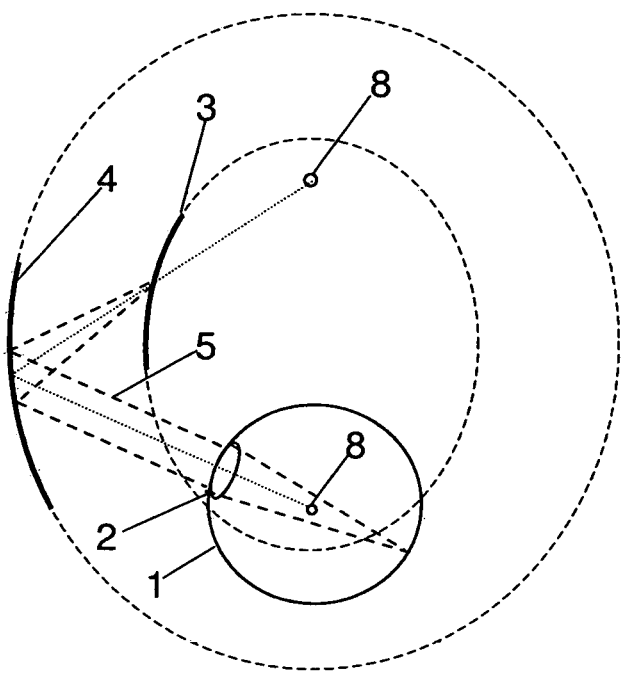
FIG. 2 shows a considered, still off-axis display assembly but with a non-planar, ellipsoid-shaped display, and an ellipsoid-shaped mirror.

In the course of developing the present invention, the off-axis configuration has been re-assessed, and a long rotation ellipsoid (FIG. 2) has been considered as an ideal shape for a mirror (4), one focus point of which is located in the center of the eye. Light beams emanating from there will hit the other focal point (8) of the ellipsoid without astigmatism.

The usual default approach in augmented an virtual reality applications is an image generation providing the virtual images in the infinite (collimated optics). It turns out that with this ellipsoid mirror (FIG. 2), parallel beams emanating from the eye (5) are focused on an area being almost exactly a smaller rotation ellipsoid (3) having the same focal points as the mirror ellipsoid. The pixels of the display should hence ideally be located on this surface.

A display having this shape will be imaged by the mirror evenly crisp, throughout a wide viewing angle. However, there are geometrical limits to the size of the display. The display should interfere as little as possible the physiognomy of the user and it should also not cover parts of the outside view.

An optical analysis by ray-tracing, as well as theoretical considerations, also showed that this simple off-axis configuration can not achieve the full resolution of the eye, even with the ideally shaped, convex display. One reason for this is, that the focal length strongly changes over the mirror surface. With collimated optics (eye accommodation to infinity), the effective mirror surface area for a specific viewing direction is always about the same as the effective pupil size (2) of the eye. From one side of the pupil to the other, the focal length changes significantly already, resulting in a considerable blur.

Therefore, without the insertion of additional optical elements such as Lenses, this principle can only yield about half the eye resolution. Although this is a performance comparable to most of the previously available civilian displays, it cannot satisfy in the end. The use of optical lenses for conditioning the beam path would—as already mentioned—be disadvantageous because of the space requirements and weight. Even more mirror elements are no solution because of their space requirements (Example: [2]) and their usually resulting very small exit pupil.

A central idea of the invention implies that a change in the beam path of the off-axis configuration toward smaller angles, ideally to a coaxial (on-axis) configuration, would avoid the disadvantages described. This, however, would move the display device itself into the line of sight toward the environment, disabling augmented reality applications.

According to the invention, this problem is solved by use of a display emitting light only at its front side—facing away from the eye—and being at least partially transparent especially from its back side—facing the eye —, providing a clear transparency with lowest possible degradation of crispness or contrast.

In a preferred embodiment of the invention (FIG. 3) both the display (3) and the mirror (4) are shaped as spheres with center points at the center of the eye (1). This results in always equal optical conditions for arbitrary viewing directions, according to arbitrary rotations of the eyeball.

It turns out that the display sphere should preferably have half the diameter of the mirror sphere, because this results in the display being in focus with the eye adapted to infinity. Practically this also defines a certain useful size range for mirrors and display, because with a binocular eyeglasses construction, the mirrors for left and right eye should not overlap, and also the display should not interfere with the eye surrounding physiognomy. This indicates a mirror radius of about 4 cm and a display radius of about 2 cm.

The mirror naturally has no chromatic aberration, and the spherical aberration in this configuration will not exceed that of the eye lens. This is because (for eye adaptation to infinity) the effective mirror surface has the same size as the eye lens aperture, and has approximately the same focal length (approximately 20 mm; in FIG. 3 this is shown by the beam path (5) for the light emitted from a point (6) on the display).

The optical analysis of said embodiment accordingly results in a resolution of 1 arc minute or better for an extremely large field of view, essentially only being limited by the user physiognomy (nose, eyebrow). Shape and dimensions are suitable for everyday use and the exit pupil is relatively large, it has a useful diameter of up to 10 mm. This allows to use an ordinary eyeglasses frame without additional fixation.

In the following we describe some known ways of implementing back side transparent displays. It should be emphasized that the present invention is not limited to these ways of implementation.

Displays clear transparent from the back side can in principle be realized in that the active pixels including the control electronics only cover a portion of the surface, allowing to look through the gaps between the pixels. The control electronics may even be partially or fully transparent.

With typical pixel sizes of less than 6 microns resulting for the display, the structures are so small that they hardly affect the direct view. Seeing through the display at an angle might however cause diffraction effects with these structure sizes. If required, this can be countered by a slightly irregular configuration of the display pixels.

The thickness of the functional layers is very low (emission layer of OLED displays typically from 0.1 micron). This should not preclude the implementation of the required structure sizes.

Back side transparent displays were publicly demonstrated in 2013 by Toshiba™ as large area flat-panel displays (there called "transmissive displays"). In this case, non-transparent structures with gaps were used. There also are known examples of already realized fully transparent OLED displays, where one would only have to cover the emitting pixel areas unilaterally to obtain the same effect. Preferably one would use reflective coatings, in order to double the front emission. Also wavelength selective, otherwise transparent mirror layers (dichroic mirror) could be used for this purpose. This could achieve a further increase in back side transparency.

Figure 4:
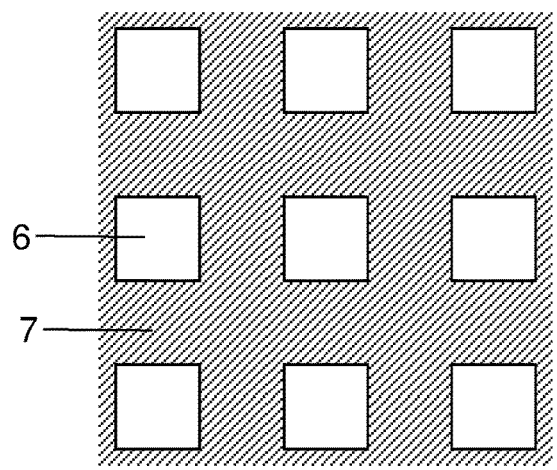
FIG. 4 shows an exemplary pixel raster for the transmissive display.

As illustrated in FIG. 4, it is easily possible to assign e.g. ¼ of the display surface to pixels (6) and more than 75% to gaps (7), hence transparency. By increasing the intensity of the emitting surfaces, the same overall screen brightness as with a full area display can be achieved.

Figure 3:
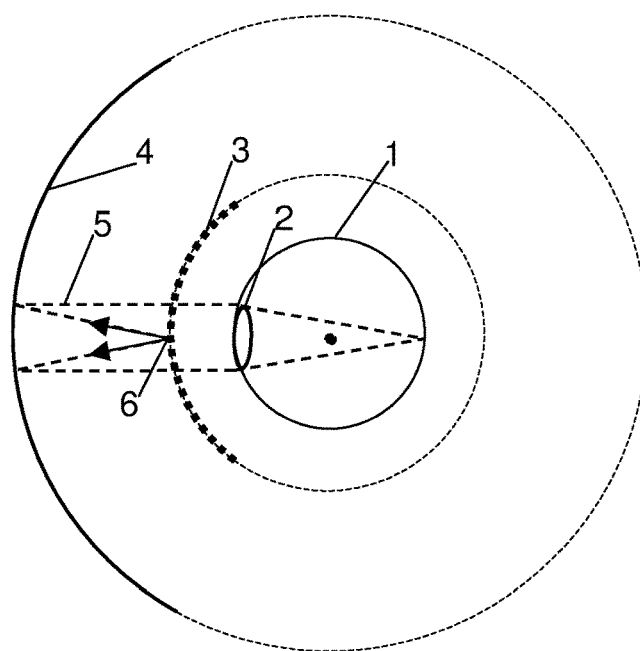
FIG. 3 shows an ideal embodiment of the invention, comprising a spherical, emissive display transparent from the back side and a spherical, semi-transparent mirror.

The light emission at the front side in an application according to FIG. 3 is visible for outsiders and could be irritating. In augmented reality applications, however, only a small part of the display is always active to display virtual objects or information. This due to the fact that otherwise the direct line of sight (outside view) would be severely affected. Likewise in direct eye contact with other people, no objects should normally be mapped in that direction. The frontal emission should therefore normally not be a problem With a display for example having only 3 narrow-banded spectral emission lines for the primary colors red, green and blue, the mirror can be implemented as a color selective mirror. Dichroic or holographic mirrors have this property. This would reflect the display emission by almost hundred percent and thus isolate it toward the environment. Moreover, regarding the entire visible spectrum, such a mirror would have a very high degree of transmission and, together with the transmissive display, allow for an almost unobstructed view on the outside world.

The proposed concept according to the invention can be varied for other display shapes. For example, one could use a planar display (3) placed close to the eye, combined with a correspondingly optimized concave mirror (4). A new method for a direct synthesis of an ideal mirror shape was developed to evaluate it. The evaluation of the result obtained showed that in this case the resolution achievable decreases toward the edge, from 1 arcmin at the center to about 3 arcmin at the edges of a 40° field of view, but this is still sufficient for many applications. The entire display glasses in this case are hardly larger than conventional eyeglasses, as the mirror is a relatively flat dome of only 50 mm diameter, for a total field of view of up to 70°. This is significantly smaller than the above considered elliptical mirror and display assembly, and the overall perceived resolution is better.

Figure 5:
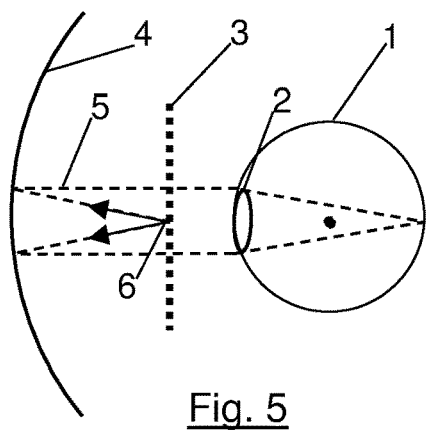
FIG. 5 shows an example with a planar display transparent from the back side and an accordingly optimized, concave, semi-transparent mirror.

Another preferred embodiment would be a cylindrical display combined with a mirror, combining the shape of the spherical embodiment for in its horizontal cross section (FIG. 3) with the one from the example with dome mirror and planar display for its vertical cross section (FIG. 5).

A display bent in only one direction is easily achievable with current technology. For the horizontal this works similar to the spherical design, providing a virtually unlimited horizontal field of view, while the blur at the vertical field of view edges is only slightly larger than with a planar display.

Other embodiments can be variations of the ellipsoid design described above, or mixed forms. Calculations showed that in some cases, even a very small display bending, below 1 mm, can be of significant optical advantage. Furthermore, it is possible to optimize the central regions of the display and mirror shapes for sharpness and the edges more according to physiognomic requirements, in favor of a larger field of view.

Figure 6:
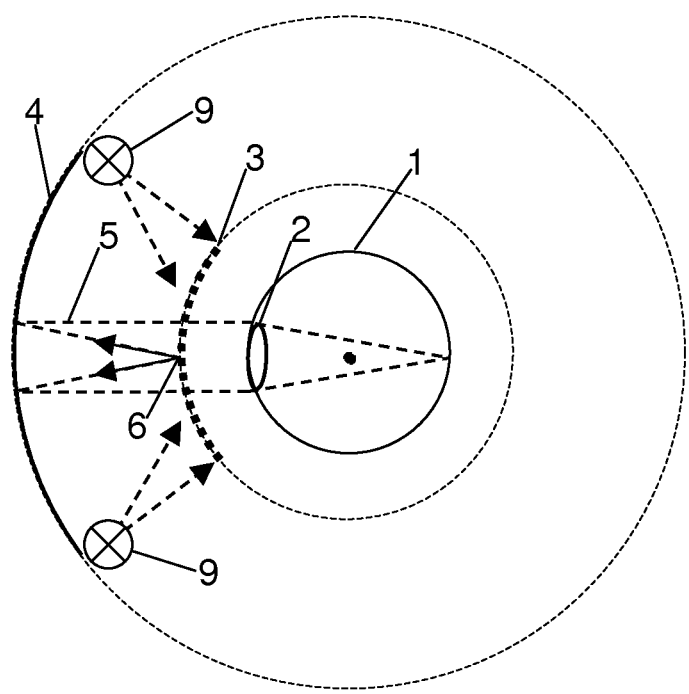
FIG. 6 shows an embodiment of the invention, comprising a spherical, light modulating display transparent from the back side, two of an arbitrary number of light sources illuminating the display, and a spherical, semi-transparent mirror.

A further embodiment of the invention (FIG. 6) may use a light modulating display (3) with additional light sources (9), as an alternative to self-emitting matrix displays.

Figure 7:
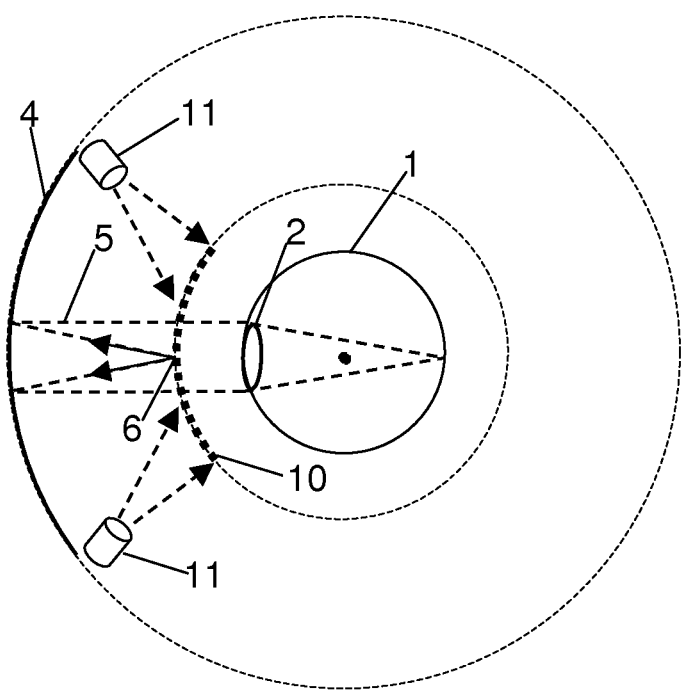
FIG. 7 shows an embodiment of the invention, comprising a spherical device carrying passive, light reflecting pixels and being transparent from the back side, two of an arbitrary number of image forming projectors illuminating the light reflecting pixels with an image, and a spherical, semi-transparent mirror.

Another embodiment (FIG. 7) involves the use of a matrix of passive light-scattering or reflecting elements (10), on which images are projected using one or more projection devices (11). This matrix may be designed corresponding to that of the above described display dot matrix, but it may also be a quasi continuous surface incorporating reflective elements, for example, as holographic (Bragg) structures. In combination with appropriately designed micro projectors, it reflects the projected light similar to the emissions of an active display. A particular advantage of this variant is that the passive dot matrix can more easily be realized in any curved shapes. The projection device including optics can be realized very small and therefore complex lens optics are possible for it, without significant additional weight.

Finally we propose a possible embodiment in which a part of the display pixels is replaced by light-sensitive elements, which together act as a camera array. Since the mirror always depicts the retina of the eye crisp on the display surface, this allows to create a retina tracker integrated into the display, for the measurement of eye movements.

Adding an eye tracking device also allows for a dynamic focus adaptation according to the distance of virtual objects displayed to the user. This requires nothing but a small re-positioning of the display against the mirror, typically of less than one mm.

NON-PATENT LITERATURE CITED

[1] Method of achieving a wide field-of-view head-mounted display with small distortion Jianming Yang, Weiqi Liu, Weizhen Lv, Daliang Zhang, Fei He, Zhonglun Wei and Yusi Kang OPTICS LETTERS Jun. 15, 2013/Vol. 38, No. 12/2035

[2] Optical free-form surfaces in off-axis head-worn display design. O. Cakmakci, S. Vo, S. Vogl, R. Spindelbalker, A. Ferscha, and J. P. Rolland. In: Proceedings of The 7th IEEE and ACM International Symposium on Mixed and Augmented reality, ISMAR, pages 29-32, New York, 2008. Springer. 738

PATENTS CITED

[3] US 2013/0286053 A1 (Fleck) "Direct View Augmented Reality Eyeglass Type Display".

What is claimed:

1. Apparatus for viewing an image generated by a signal or information processing system or a computer,
   the apparatus comprising either one display and optics assembly for one eye or two display and optics assemblies, one of them dedicated to each eye of a user,
   the display and optics assemblies each being characterized by consisting of:
   (a) a display,
   the display from a front surface of which, which is facing away from the eye, light can be emitted or reflected as an areal light pattern representing an image,
   the display surface having a shape being at least partly part of a cylindrical or elliptical shape curved around the eye,
   the display being at least partially transparent, allowing to see through it from its back side which is facing toward the eye; and
   (b) the optics assembly consisting of a single non-transparent or semi-transparent mirror,
   a mirror back reflecting and focusing toward the eye the areal light pattern emanating from the display and thereby allowing the image to be viewed through a back side of the display,
   the mirror having an optical shape being form-invariant and part of uniformly continuous shape curved around the eye,
   the mirror providing to the eye the image as a virtual image.

2. The apparatus of claim 1 wherein the front surface of the display comprises a dot pattern of non-transparent partial areas working as a light reflecting or light emitting active matrix display showing the image, and wherein the display also comprises transparent partial areas in between the non transparent areas, allowing for seeing through the display.

3. The apparatus of claim 1 wherein the front surface of the display comprises a dot pattern of passive reflective partial areas diffuse reflecting an image provided by at least one image projector focused on the front surface of the display, and wherein the display also comprises transparent partial areas in between the reflective areas, allowing for seeing through the display.

4. The apparatus of claim 1 wherein the front surface of the display is at least partly shaped as part of an ellipsoid with a center of the eye as one geometrical focal point of the ellipsoid, and the optical shape of the mirror is at least partly part of a larger ellipsoid sharing the same geometrical focal points with the display ellipsoid.

5. The apparatus of claim 1 wherein the front surface of the display is at least partly shaped as part of a spherical surface with a center of rotation of an eyeball of the eye as its center and the optical shape of the mirror is at least partly part of a larger sphere also having the center of rotation of the eyeball of the eye as its center.

6. A method for displaying images, characterized in that by means of the apparatus according to claim 1, images of any kind, including but not limited to information, media content and simulated objects and scenes for virtual and augmented reality applications, are fed to one or both eyes of the user.

7. The apparatus of claim 1 wherein the shape of the front surface of the display is at least partly part of a cylindrical shape around the eye and the optical shape of the mirror is at least partly part of a barrel-shape around the eye outside of the display shape and with the same orientation as the display shape.

8. The apparatus of claim 1 wherein the display surface also incorporates light-sensitive areas which together act as a camera sensor observing a retina of the eye and which are thereby allowing to implement a retina tracker to detect the user's eye movements.

\* \* \* \* \*